United States Patent [19]

Hardesty

[11] 4,149,555

[45] Apr. 17, 1979

[54] GAS-ACTUATED VALVES

[75] Inventor: Thomas K. C. Hardesty, Ednor, Md.

[73] Assignee: The United States of America as represented by the Secretary of the Navy, Washington, D.C.

[21] Appl. No.: 826,508

[22] Filed: Aug. 22, 1977

[51] Int. Cl.² .......................................... F16K 17/40
[52] U.S. Cl. ................................... 137/68 A; 137/67; 251/28; 251/63; 251/73; 251/325
[58] Field of Search .................... 89/1 B; 137/67, 71; 9/314, 316, 319; 114/333; 220/261; 280/736, 737, 741, 742; 251/62, 63, 63.5

[56] References Cited

U.S. PATENT DOCUMENTS

| 2,405,439 | 8/1946 | Lubbock et al. | 137/68 A |
|---|---|---|---|
| 2,690,669 | 10/1954 | Giladett | 137/68 R X |
| 3,093,151 | 6/1963 | Merkowitz | 137/68 A |
| 3,109,553 | 11/1963 | Fike et al. | 220/261 |
| 3,141,470 | 7/1964 | La Fontaine | 137/68 A |
| 3,202,162 | 8/1965 | Eckardt et al. | 137/68 A |
| 3,469,733 | 9/1969 | Montgomery et al. | 220/89 A |
| 3,474,809 | 10/1969 | Gordon | 137/70 |
| 3,494,370 | 2/1970 | Wahl et al. | 137/68 A |
| 3,620,237 | 11/1971 | Sindall et al. | 137/67 |
| 3,780,752 | 12/1973 | Noddin et al. | 137/68 A |
| 3,889,703 | 6/1975 | Keathley | 137/67 |
| 3,983,892 | 10/1976 | Hardesty | 137/68 A |

Primary Examiner—William R. Cline
Assistant Examiner—Richard Gerard
Attorney, Agent, or Firm—R. Sciascia; R. Beers; S. Sheinbein

[57] ABSTRACT

A plurality of gas actuated valves capable of high-speed action, great pressure endurance and withstanding shock, vibration and a marine environment. A sliding member, closing the valves inlet ports, may be retained by a frangible flange. Electrically-initiated gas cartridges produce a rapid pressure rise causing the sliding member to be displaced thereby shearing the flange and allowing the sliding member to uncover the inlet ports for ambient fluid entry. A plurality of O-rings minimize functional sensitivity to external pressure and seal the valve against the entry of the ambient fluid.

15 Claims, 10 Drawing Figures

GAS-ACTUATED VALVES

BACKGROUND OF THE INVENTION

The invention relates to quick-opening valves actuated by gas pressure. More particularly, it relates to an improved normally closed valve which is rapidly driven to an open position by the pressure developed by an explosion.

Explosive valves find use in numerous fields. Such valves have traditionally been used for the protection of pressure vessels, conducting of fluids at extremely high flow rates and under high pressure conditions and other flow control uses. Another use of such devices is to seal a compartment as in a submerged weapon or other marine hardware, and then to flood the compartment at some later time.

Previous methods of accomplishing high speed valve action include the use of exposed explosive charges, such as shown in U.S. Pat. No. 3,983,892, issued Oct. 5, 1976, to Hardesty, U.S. Pat. No. 3,780,752 issued Dec. 25, 1973 to Noddin et al, U.S. Pat. No. 3,469,733 issued Sept. 30, 1969 to Montgomery et al and U.S. Pat. No. 3,109,553 issued Nov. 5, 1963 to Fike et al, which create noise, heat and flame hazards when initiated. Other methods utilize a confined explosive to propel a piston or pin against a frangible shear element such as shown in U.S. Pat. No. 3,494,370 issued on Feb. 10, 1970 to Wahl et al, U.S. Pat. No. 3,474,809 issued Oct. 28, 1969 to Gordon, U.S. Pat. No. 3,202,162 issued Aug. 24, 1965 to Eckardt et al, U.S. Pat. No. 3,141,470 issued July 21, 1964 to LaFontaine and U.S. Pat. No. 3,093,151 issued June 11, 1963 to Merkowitz. The above methods provide rapid valve action but detrimentally do not have, in general, the capability of withstanding vibration, shock and exceptionally high pressures to the degree possible in the instant invention. Furthermore, the present invention is, to a greater degree, more reusable than the above methods.

SUMMARY OF THE INVENTION

An object of this invention is the provision of a fast acting, reliable gas actuated valve.

Another object of this invention is to provide a reusable explosive valve having good flow characteristics.

Another object of the present invention is the provision of a rapid opening valve whose operation is independent of gravity or physical orientation.

Yet another object of the invention is to provide an explosive valve that withstands high pressures, vibration and shock without failure.

A still further object of this invention is to provide an explosive valve that breaks cleanly so that substantially no particles will be produced.

Yet another object of this invention is to provide an explosive valve which will be functionally insensitive to external pressure, confine explosive products, substantially preclude the production of loose parts and have superior characteristics in withstanding shock, vibration and a marine environment.

A final object is the provision of an explosive valve that is expected to withstand higher external pressures without deformation for a given intake orifice size than previous methods.

These and other objects of the invention are attained in one embodiment by a gas-actuated valve which has a sliding member, closing the valve's inlet ports, retained by an integral frangible flange. Electrically-initiated gas cartridges produce a rapid gas pressure rise in a pressure cavity to urge the displacement of the sliding member. The displacement of the sliding member shears the flange and allows fluid entry through the inlet ports. A plurality of O-rings, located on similar diameters, minimizing the sensitivity of the sliding member to external pressures and sealing the valve, are released upon sliding member displacement. Alternatives to a frangible flange and a low energy explosive valve are also disclosed.

BRIEF DESCRIPTION OF THE DRAWINGS

A more complete understanding of the invention and a fuller appreciation of the many attendant advantages, features and still other objects thereof will be readily derived by reference to the following detailed description when considered in connection with the accompanying drawings, wherein.

DESCRIPTION OF THE PREFERRED EMBODIMENTS

Figure 1:
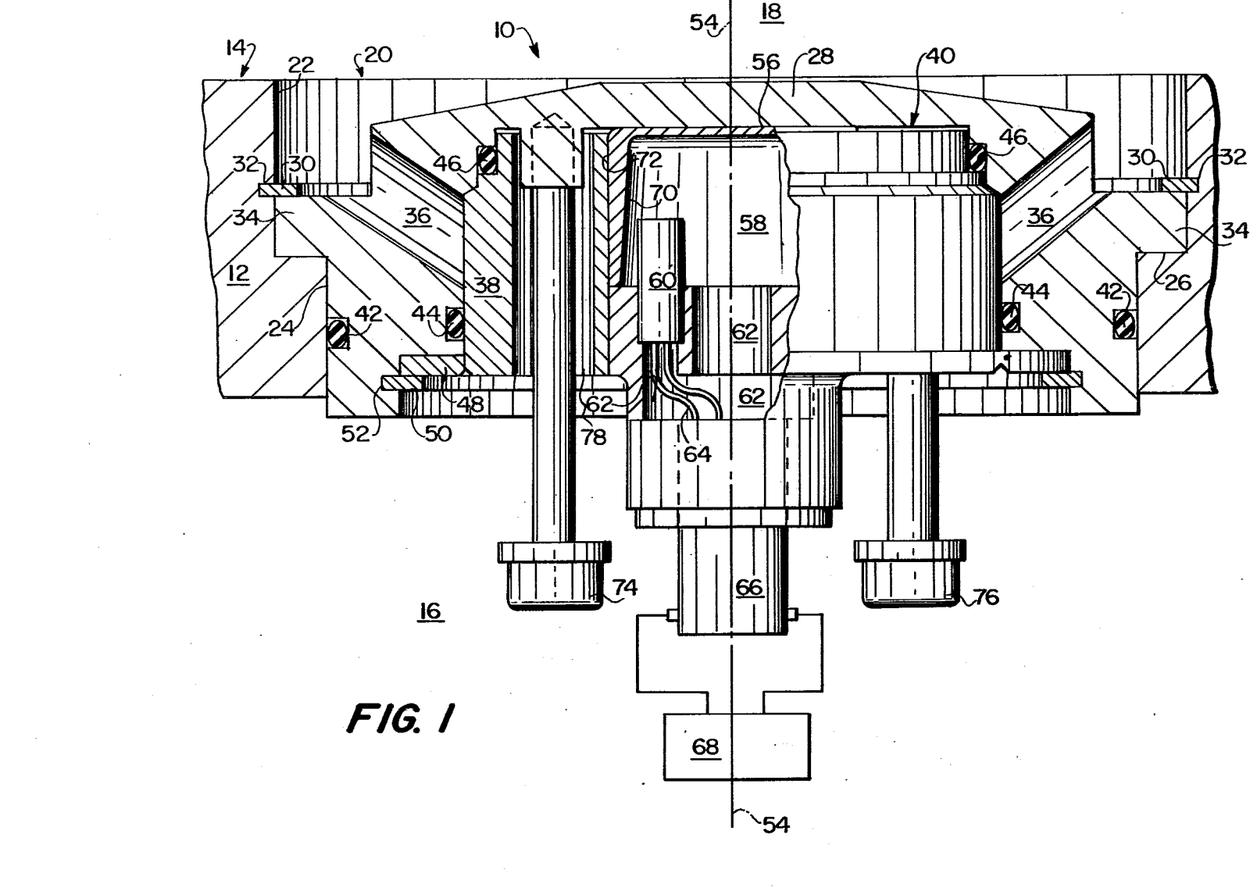
FIG. 1 is a cross sectional view of one embodiment, with parts partially broken away, of an unactuated valve.

Referring now to the drawings wherein the reference characters designate identical or corresponding parts throughout the several views and more particularly to FIG. 1 thereof wherein the unactuated valve 10 is shown mounted in a wall 12 of a container of vessel 14 such as a submerged mine or buoy whose interior 16 is filled with a dry and relatively low pressure gas, e.g., atmospheric air. The exterior 18 of the container is at a relatively high pressure, e.g., hydrostatic.

A port 20, formed within the wall 12 of the vessel, provides a means for a fluid communication between the exterior and interior of the vessel. It is seen to consist of a stepped cylindrical passageway in which a first passageway 22 is provided proximate exterior 18 followed by a second passageway 24 of reduced diameter. The stepped passageway thereby provides a supporting ledge 26 for seating an annular valve housing 28 disposed within the port. A valve housing retaining ring 30, fitted within a groove 32 formed in the first passageway 22, completes the structure necessary to releasably affix a valve housing flange 34 and thus valve housing 28 within port 20.

Proximate to flange 34 are located four equally spaced elongated inlet ports 36 formed in the circumference of the valve housing. These inlet ports are normally closed by a sliding member 38 which is capable of translating within a recess 40 formed within the valve housing. High pressure medium entry into the container is further precluded by strategically located means such as three O-rings 42, 44, 46 which seal the valve housing 28 with respect to the container 14 and to the sliding member 38, respectively.

Sliding member 38 is retained in a normally fixed position relative to the valve housing (see FIG. 1) by an integral frangible flange 48. Flange 48 is likewise fixed relative to the valve housing 28 by a retaining ring 50 which is received in a groove 52. Since the two inner O-rings 44 and 46 lie substantially within the same locus of points which are equidistant from the valve's centerline 54, the external hydrostatic force on sliding member 38 is about balanced. This relatively balanced condition creates a minimum load condition on the frangible flange 48 thus making the functioning of the device approximately independent of external pressure and allows the same actuation force to be used regardless of the external hydrostatic pressure. The high pressure applications of the valve are thus limited only by the sealing capabilities of the O-rings and the mechanical strength of the valve housing and sliding number. As a result the valve is capable of withstanding pressures of several thousand pounds per square inch and is very resistant to shock and vibration loads.

A freely movable inverted cup-shaped piston 56 is sealingly disposed within a pressure cavity 58 formed within the sliding member 38 and serves as a means for confining any high pressure gases produced by gas cartridges 60 which are preferentially fixed in potting 62. Piston 56 is made of a suitable material, preferably a soft aluminum alloy, which is sufficiently malleable to react under pressure to seal the gases emitted by gas cartridges 60 within pressure cavity 58.

Gas cartridges 60 are supplied electrical energy via leads 64 which are linked to an electrical connector 66 from a power source, shown generally at 68.

Figure 2:
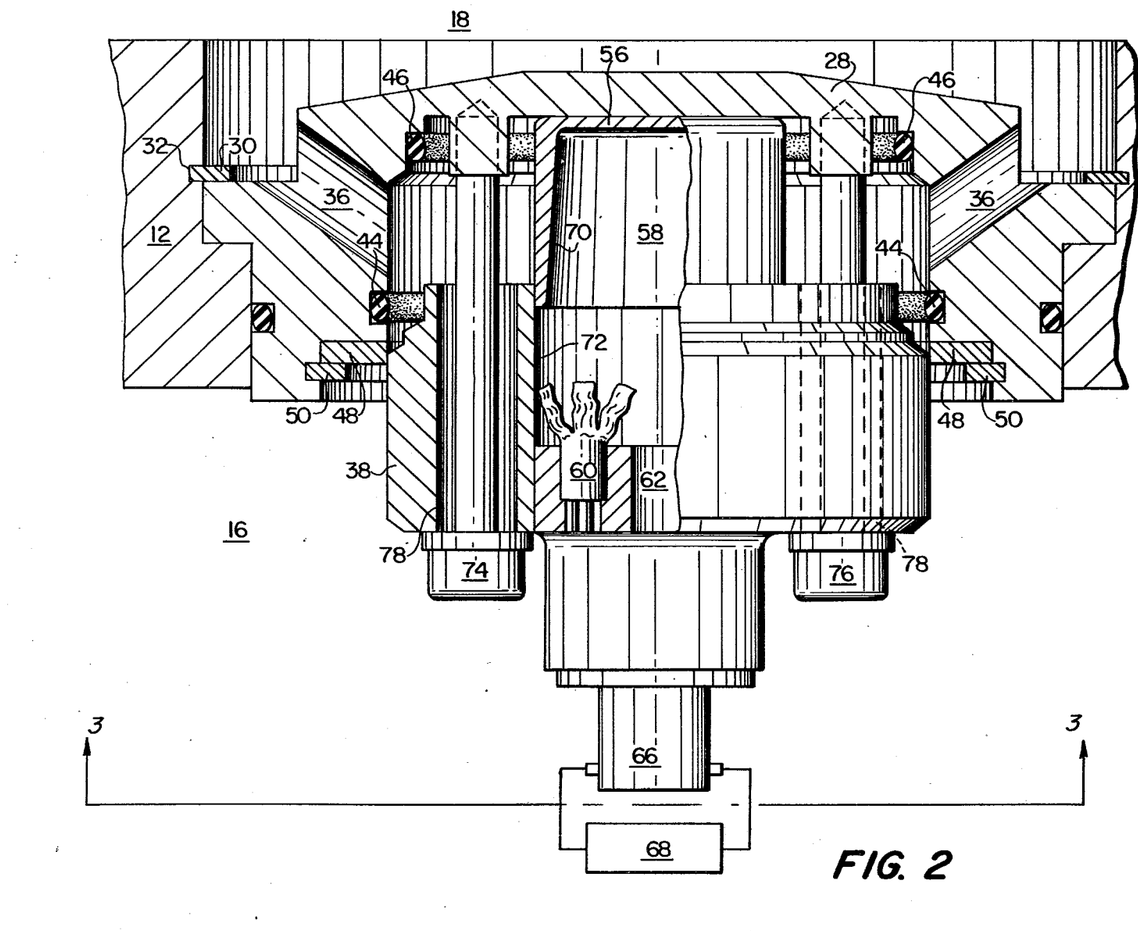
FIG. 2 shows the valve of FIG. 1 after actuation with parts partially broken away.

Upon gas cartridge activation (see FIG. 2), a rapid pressure rise is experienced in pressure cavity 58 causing piston 56 to expand sufficiently to prevent gas leakage and react against the middle of valve housing 28. The confinement of the gas products within pressure cavity 58 by the interaction of piston peripheral wall 70 with the inner surface 72 of the pressure cavity 58 (see FIG. 2), causes sliding member 38 to rapidly translate from its normal position shown in FIG. 1, shearing it loose from the frangible flange 48. The sheared flange is retained in its original position by the retaining ring 50, as shown in FIG. 2, thus precluding the substantial production of loose parts. The motion of the sliding member continues until it is halted by bolts 74, 76 which are secured in some fashion, e.g., screw threads to the valve housing 28. The valve is held in this position by the internal gas pressure or by other means, e.g., spring loaded mechanical latch, not shown.

Figure 3:
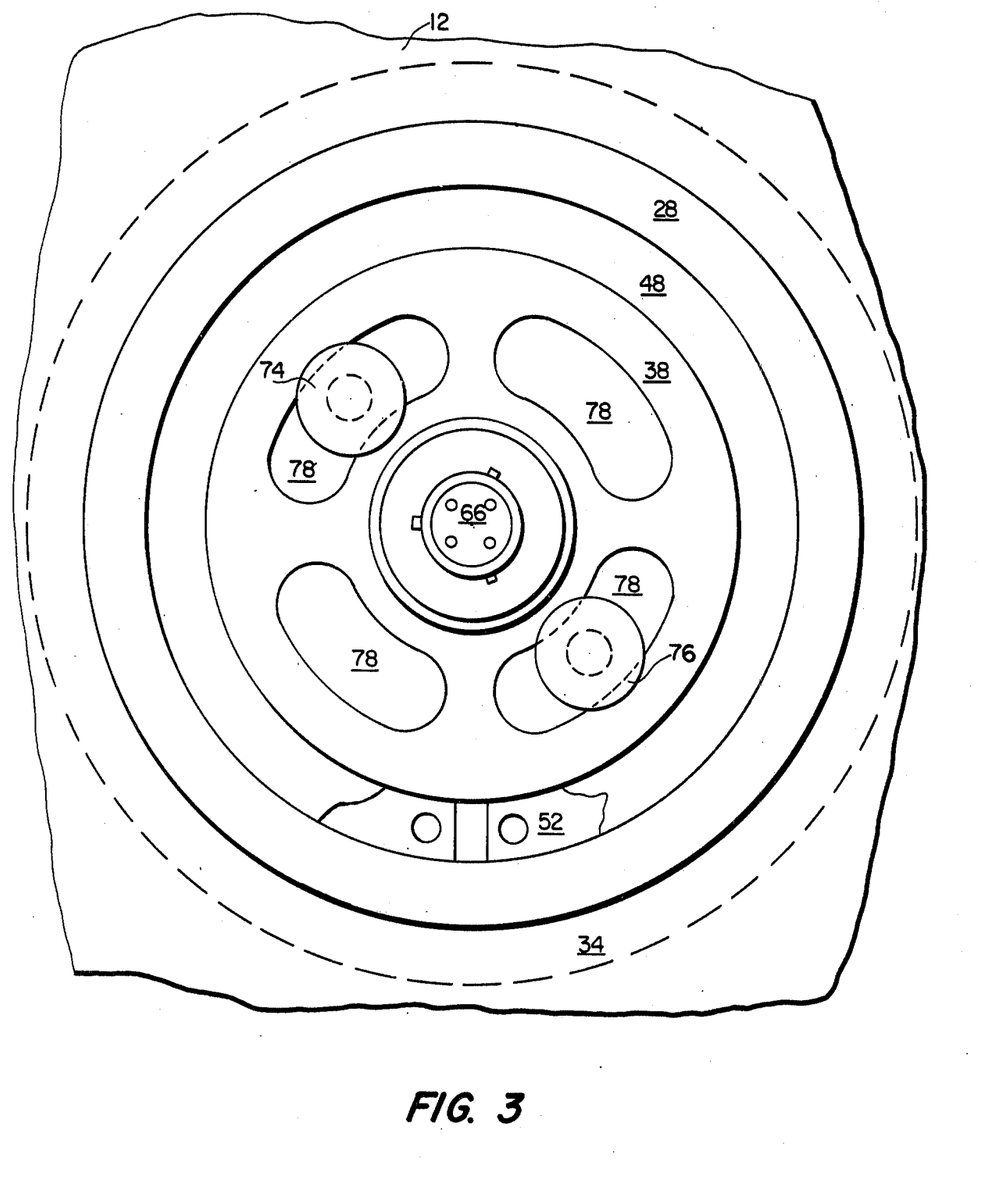
FIG. 3 shows a view of the valve as seen along line 3—3 of FIG. 2.

As shown in FIGS. 2 and 3 there are two stop bolts 74, 76 passing within longitudinal interior discharge ports 78 formed within the sliding member 38. FIG. 3 illustrates the port arrangement in which each port has an elongated cross section and whose combined cross sectional area is approximately the same as that of the exterior inlet or intake ports 36. It is also noted that although not shown as such in FIG. 1 the four equally spaced inlet ports 36 preferably have the same cross section as the exhaust or discharge ports 78. The intake ports would thus have the same cross section as the ports 41, shown in U.S. Pat. No. 3,983,892, issued Oct. 5, 1976 to Thomas K. C. Hardesty. The present arrangement ensures that there will be substantially no loss in flow characteristics as the external high pressure fluid moves through the valve.

FIGS. 2 and 3 also indicate the reasonably good flow characteristics expectant of the valve as the inner O-rings 44, 46 are unseated due to the movement of the sliding member in uncovering the intake ports. The high pressure medium flows through the intake ports 36, over the top of the sliding member 38, and enters the interior 16 of the vessel 14 via the elongated longitudinal discharge ports 78.

Figure 4:
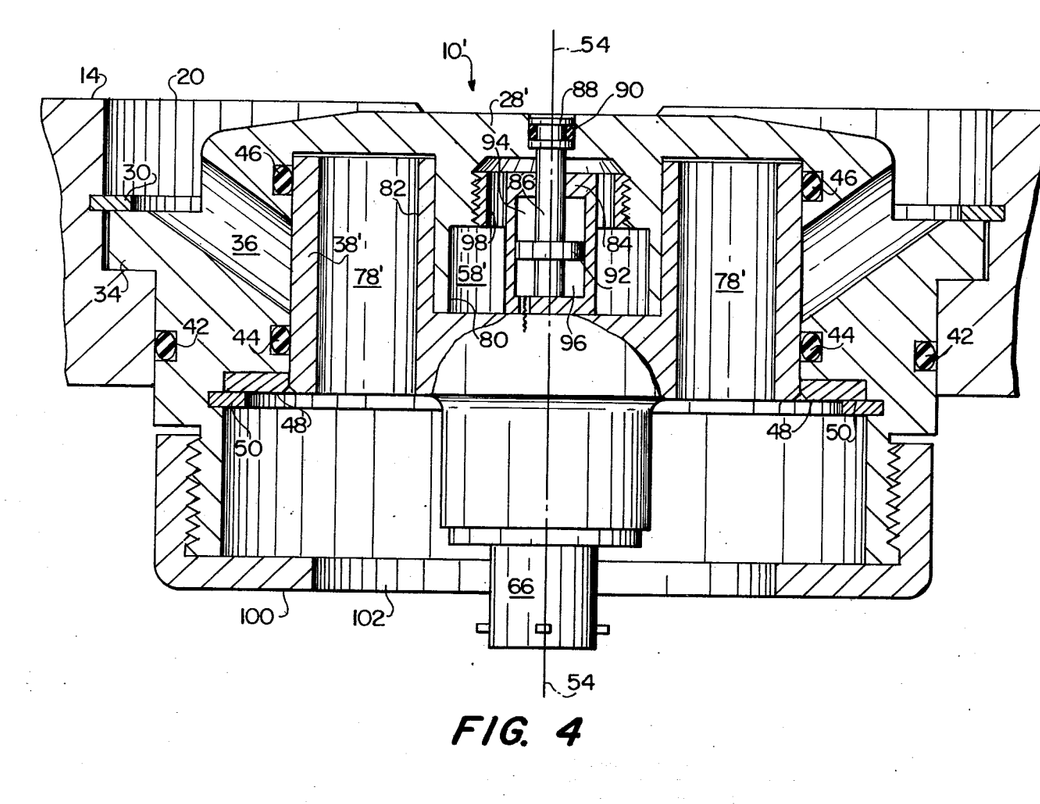
FIG. 4 shows a cross sectional view of a hydrostatically operated alternate embodiment of the valve in its normal or unactuated state.

FIG. 4 depicts a more reusable alternative valve which is inherently safer than that shown in FIG. 1 since it is actuated by external ambient pressure, e.g., hydrostatic. This valve would be valuable for underwater applications, etc., where sufficient external hydrostatic pressure is available. Furthermore, operability of the valve of FIG. 4 is more resistant to the ravages of incrustation for reasons which will subsequently be clear.

The valve 10' of FIG. 4 is shown in situ in a port 20 of a vessel or container 14. A valve housing 28' having a flange 34 rests on a supporting ledge 26 formed in port 20 and is releasably affixed therein by a retaining ring 30. Proximate flange 34, four equally spaced intake ports 36, having an elongated cross section, are formed in the valve housing. The valve housing is sealed within the port by O-ring 42.

Fluid communication between the exterior and interior of the container 14 via the intake ports 36 is precluded by a sliding member 38' which is releasably secured within valve housing 28' by an integral frangible flange 48 held in position by a retaining ring 50. Member 38' is sealed within the valve housing 28' by two O-rings 44 and 46 which are located at precisely the same radial distance from the centerline 54 of the valve thereby making the valve perfectly balanced. This balanced condition results in minimal loading on the flange 48 allowing the functioning of the device to be independent of external pressure and allows the same actuation force to be used independent of external hydrostatic pressure. In fact, it is the external hydrostatic pressure which actuates the valve of FIG. 4 when the vessel is sufficiently submerged in a fluid medium such as water.

Sliding member 38', in conjunction with valve housing 28' combine to create a pressure cavity 58'. Pressure cavity 58' confines high pressure fluid through the sealing cooperation between a cylindrical wall 80 extending from an inside lower surface of the housing 28' and an inner cylindrical wall 82 of the sliding member 38'. Upon valve actuation, the linear extent of these two walls is sufficient to preclude substantial loss of fluid from pressure cavity 58'.

An explosive actuator support housing 84 is secured within pressure cavity 58', as by a threaded connection, to the valve housing 28'. It slidingly supports, in an internal cylindrical bore, an explosive actuator 86 operating an intake valve or plug 88 which may be integrally connected to the actuator. Valve 88 is sealingly fitted within an orifice 90 formed in an upper surface of valve housing 28' which bounds the ambient fluid.

An obturator 92 slides within internal cylindrical bore or chamber 94 within housing 84 and divides the chamber into an upper bore and lower bore compartment or chamber. Obturator 92 may, of course, be integral with actuator 86, but in any event, must be fixed with respect to the actuator. The lower compartment is filled with a low level explosive 96 which is ignited by some ignition means such as a bridge wire supplied with electrical energy via an electrical connector 66.

Upon valve actuation, explosive 96 generates high pressure gas in the lower chamber which acts upon obturator 92 causing the explosive actuator to force intake valve 88 out of its sealed position normally closing orifice 90 thus allowing ambient fluid to flow through a plurality of conducts 98 formed in actuator housing 84, into pressure cavity 58'. As was explained earlier, walls 80, 82 provide the means for confining entering high pressure fluid pressure cavity 58'. With the rapid increase of pressure in cavity 58', usually hydrostatic, frangible flange 48 severs allowing sliding member 38' to translate and uncover intake ports 36, thus providing for the entry of the ambient fluid into the interior of the vessel 14. The motion of the sliding member 38' is limited by a stop cap 100 fastened as by a threaded connection to valve housing 28'. Stop cap 100 allows fluid entry into the vessel through an opening 102 which is configured for good flow characteristics. The threaded stop cap construction also aids in making the valve more reusable, as is apparent.

Incrustation is less of a problem for the valve of FIG. 4 inasmuch as any deposits near orifice 90 are substantially removed when intake valve 88 is unseated during actuation. Furthermore, the hydrostatically operated valve of FIG. 4 is extremely safe to handle since it requires lower explosive energy for actuation.

If required for a given application, the valves of FIGS. 1, 4 could operate with various types of elements in lieu of a frangible flange. Such alternatives include a shear pin of the type shown in FIG. 5 as element 104 or a bending type washer of the type shown by FIG. 6.

Figure 5:
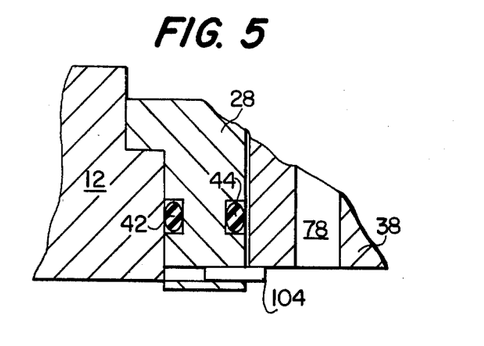
FIGS. 5 and 6 illustrate partial sectional views of the valve in which a shear pin and washer, respectively, are used in lieu of a frangible flange.

FIG. 5 shows the shear pin coacting on one side with the sliding member's lower surface in order to releasably secure same. Another portion of the shear pin is fixedly secured within the valve housing 28.

Figure 6:
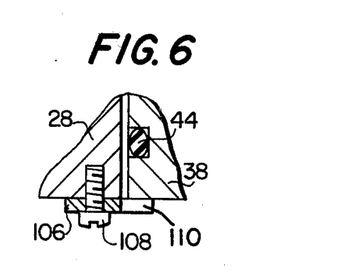
Figure 7:
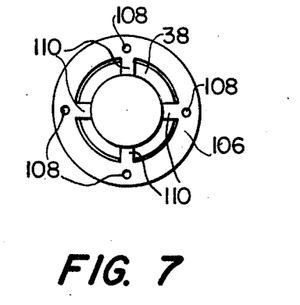
FIG. 7 is a plan view showing the washer of FIG. 6 and a sliding member partially broken away.
Figure 8:
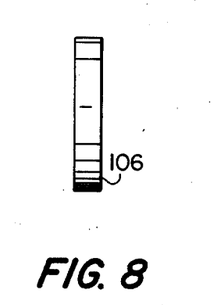
FIG. 8 shows the structure of the washer prior to valve actuation.
Figure 9:
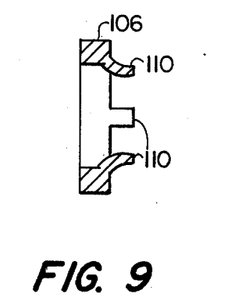
FIG. 9 shows the washer after valve actuation.

FIG. 6 shows a fragmented cross sectional view of the bending type washer 106 where a frangible flange would normally appear. Sliding member 38 is held in its normal inlet port closing position by a plurality of radially inwardly directed prongs 110 which coact with a lower surface of member 38. Washer 106 is shown as a ring and is fixed to the valve housing by some means such as screws 108. FIG. 7 illustrates a plan view of the washer's prongs 110 which releasably affix the sliding member. Before valve actuation the washer's internal prongs are undeformed and planar as depicted in the side view of FIG. 8. After valve actuation, when sliding member 38 or 38' is caused to translate either by explosive gases or external pressure, the prongs 110 of washer 106 are deformed out of their plane as shown in FIG. 9, thereby releasing the sliding member. The prongs also serve to prevent reclosure of the sliding member by remaining in resilient contact with the sliding member.

Figure 10:
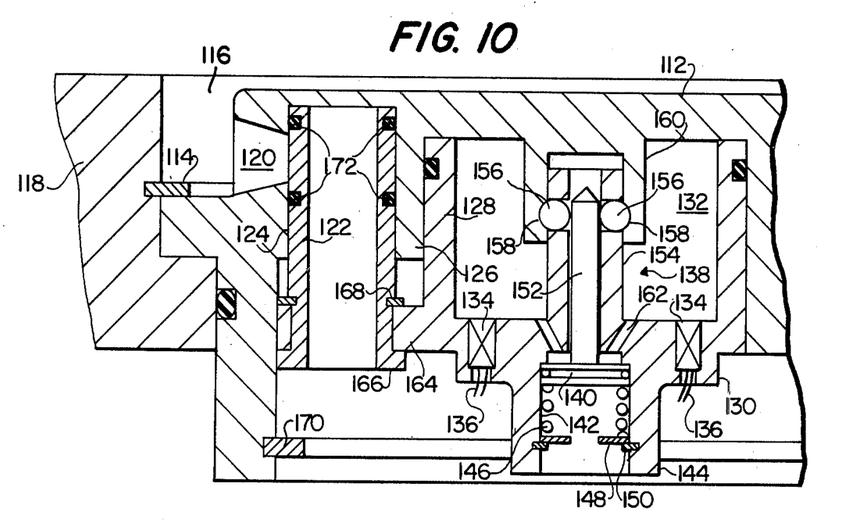
FIG. 10 partially depicts a high flow, gas actuated valve which utilizes a ball lock as an alternative to a frangible flange.

A ball lock design may also serve as a highly reusable alternative to a frangible flange. The ball lock design of FIG. 10 would improve reuse of parts thereby making the valve more versatile. FIG. 10 shows a gas actuated, gas unlocked valve having the instant ball lock design. In this configuration the valve housing 112 is secured by a retaining ring 114 in a port 116 located in a wall 118 of a vessel or container. The valve housing's equally spaced circumferential intake ports 120 are normally closed by discharge flow tubes 122 which are freely and sealingly reciprocable within passageways 124 formed in housing 112. Ports 120 may also be elongated and have the same cross section as is shown in U.S. Pat. No. 3,983,892, mentioned earlier.

A plurality of O-rings 172, fitted in circumferential grooves formed in the walls of flow tube 122, functionally seal the annular sliding member 130 with respect to the valve housing 112. Passageways 124 are formed in part by a cylindrical wall 126 which extends from a lower interior surface of valve housing 112. This wall also sealingly cooperates with a cylindrical wall 128 of a generally cup shaped sliding member 130 to create a pressure cavity 132. The linear extent of both wall 128 and wall 126 is such that upon valve actuation gaseous pressure within cavity 132 is substantially maintained. High pressure gaseous products are generated by gas cartridges 134 which are secured in potting, electrically initiated, and supplied via leads 136 with electrical energy from an electrical source (not shown).

Sliding member 130 is fixed in its normal position shown in FIG. 10 by a ball lock means shown generally as 138. Ball lock means 138 is seen to consist of a ball release piston 140 which is sealingly slidable in an open-ended bore 142 formed in an extension 144 of sliding member 130. Piston 140 divides bore 142 into an upper and lower chamber and is biased towards the upper chamber, as shown in FIG. 10, by a lock spring 146. Lock spring 146 is releasably fixed using a washer 148 and retaining ring 150.

Integral with release piston 140 is a stem 152 which rides in the bore of a tube 154 formed in the sliding member. Stem 152 releasably holds in position two steel balls 156 which are nestled in the walls of tube 154. Balls 156 further cooperate with grooves 158 which are formed in a second cylindrical wall 160 extending from the interior surface of housing 112. As can be seen from FIG. 10, so long as stem 152 is positioned as shown, the steel balls 156 lock the sliding member 130 to the valve housing 112.

Upon valve actuation the gas cartridges 134 generate a high pressure gas which rapidly increases the pressure in cavity 132 tending to force sliding member 130 away from its locked position. Gases pass through passages 162 formed in the sliding member and enter the upper chamber of bore 142 and thereupon react on piston 140. Piston 140 moves downwardly in opposition to lock spring 146 thereby causing stem 152 to translate in a like manner. This downward movement of stem 152 releases steel balls 158 from their locked position allowing sliding member 130 to translate downwardly. As member 130 moves downwardly it causes flow tubes 122 to uncover intake ports 120 thus causing ambient fluid to flow into the vessel. The interconnection between the sliding member 130 and the tubes 122 is shown as an interdigitation of the tubes 122 in a flange 164 of member 130. Tubes 122 have a flange 166 which coacts with a lower surface of flange 164. A retaining ring 168 locks each tube 122 to the sliding member 130.

Lastly, a stop ring 170, fitted within a circumferential groove in housing 112, acts as a constraint on the extent of the downward motion of member 130. In use stop ring 170 coacts with the flange 166 of flow tubes 122. Of course, for applications having sufficient space, the valve housing 112 can be lengthened and a threaded cap can be used to stop the sliding member generally as in FIG. 4.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A gas actuated valve, comprising:
    a housing configured for sealable retention within an opening in a fluid impervious wall, said housing having a centerline and defining a high pressure side, a low pressure side, an interior cavity open on said low pressure side, and a plurality of inlet ports, each communicating between the high pressure side of said housing and said interior cavity along a straight line angled to said centerline and directed for flow toward said low pressure side;
    an annular member positioned within said cavity and being slidable between first and second positions along said centerline of said housing, said annular member having a plurality of separate outlet ports, each communicating between said interior cavity and the low pressure side of said housing along a line parallel with said centerline of said housing, and being configured for discharge in a direction parallel with said centerline, said annular member sealingly closing said inlet ports in said first position;
    yielding retention means positioned within said interior cavity and coacting with said annular member and said housing for releasably retaining said annular member in said first position; and
    gas actuation means positioned within said interior cavity for forcing said annular member from said first position to said second position in response to an electric signal.

2. A valve as set forth in claim 1 wherein said yielding retention means comprises:
    said housing having a counterbore and bore step on said low pressure side defining said open end of said interior cavity, said counterbore including a retaining ring groove spaced from said bore step;
    said annular member having a frangible flange received in said counterbore against said bore step in said first position; and
    a retaining ring engaging said retaining ring groove and securing said frangible flange to said housing;
    whereby said frangible flange releasably retains said annular member in said first position and parts from said annular member in response to said annular member being forced from said first position to said second position by said gas actuation means.

3. A valve as set forth in claim 1 wherein said yielding retention means comprises:
    a shearable pin having a first portion fixed within said housing and a second portion releasably coacting with said annular sliding member;
    whereby said shearable pin releasably retains said annular member in said first position and fails in shear in response to said annular member being forced from said first position to said second position by said gas actuation means.

4. A valve as set forth in claim 1 wherein said yielding retention means comprises a bending type washer being configured as a ring having internal prongs directed radially inwardly, said ring being fixedly attached to said housing and said prongs releasably coacting with said annular member;
    whereby said prongs releasably retain said annular member in said first position and deflect in response to said annular member being forced from said first position to said second position by said gas actuation means.

5. A valve as set forth in claim 1 wherein said yielding retention means comprises a ball lock means.

6. A valve as set forth in claim 5 wherein said ball lock means comprises:
    said annular member defining an open-ended chamber, a passageway axially aligned with and communicating with said open-ended chamber, and lateral passages opening off said passageway for containing locking balls;
    a piston sealingly slidable within said open-ended chamber between locking and releasing positions and dividing said open-ended chamber into pressure and vented chambers, said piston having a stem extending a predetermined distance into said passageway in said locking position, said stem having a tapered end;
    resilient means retained within said open-ended chamber for biasing said piston and stem toward said locking position;
    a plurality of locking balls loosely supported in said lateral passages and said stem releasably biasing said locking balls radially outward from said passageway in said locking position;
    said housing having cooperating structure adjacent said lateral passages in said annular member, said structure defining walls having grooves sized and positioned for partially receiving said locking balls biased outward by said stem being in said locking position, and said annular member being in said first position;
    whereby said annular member is locked in said first position by said piston being in said locking position causing said stem to force said locking balls radially outward in said lateral passages and engage grooves in wall structure of said housing, and moving said piston to said releasing position withdraws said stem from said locking balls and enables the balls to leave the housing wall grooves, enabling the annular member to move relative to the housing.

7. A valve as set forth in claim 6 wherein said resilient means comprises a spring releasably fixed within said open-ended chamber.

8. A valve as set forth in claim 6 further including:
    said housing and annular member defining a gas generation chamber, said annular member defining a conduit communicating between said gas generation chamber and said pressure chamber; and
    gas generating means within said gas generation chamber responsive to an electric signal for pressurizing said gas generation chamber;
    whereby said gas generating means pressurizing said gas generation chamber causes pressure in said pressure chamber, forcing said piston and stem to said releasing position, unlocking said annular member from said housing, said pressure in said gas generation chamber forcing said annular member to said second position.

9. A valve as set forth in claim 1 wherein said gas actuation means comprises:
    a cup-shaped piston fitted within said interior cavity, the open end of said cup-shaped piston being directed toward said low pressure side of said housing, said piston being made of a malleable material;
    said annular member sealingly contacting the exterior sides of said cup-shaped piston, closing the open end of said cup-shaped piston, and being freely movable relative to said cup-shaped piston;

pressure means mounted on said annular member for producing a high pressure fluid within said cup-shaped piston in response to an electric signal; and electrical means communicating with said pressure means for supplying said signal;

whereby said pressure means is actuated by a signal from said electrical means, said high pressure fluid being confined within said cup-shaped piston, thereby providing a resultant force against said annular member which causes said annular member to move from said first position to said second position.

10. A valve as set forth in claim 1 wherein said gas actuation means comprises an electrically initiated gas cartridge.

11. A valve as set forth in claim 1 wherein said gas actuation means comprises:

said housing defining an actuation chamber within said interior cavity, said actuation chamber being open toward said low pressure side of said housing, and said housing defining a passage communicating between said actuation chamber and said high pressure side of said valve;

said annular member having a pressure surface closing said open end of said actuation chamber in said first position;

an intake valve sealingly closing said passage and moveable between closed and open positions, said intake valve having a stem extending into said actuation chamber and an obturator attached to said stem;

an operating cylinder attached within said actuation chamber, closely fitting said stem, and cooperating with said obturator to define driving and accepting chambers, said operating cylinder being configured to enable fluid communication from said passage to said pressure surface;

high pressure gas generating material confined within said driving chamber; and electrically responsive means communicating with said driving chamber for initiating said gas generating material;

whereby said electric signal causes said electrically responsive means to initiate said gas generating material within said driving chamber, thereby generating high pressure gas in said driving chamber which forces said obturator toward said accepting chamber, causing said stem to move said intake valve from said closed position to said open position enabling flow of high pressure ambient fluid from the high pressure side of said housing to said pressure surface of said annular member and enabling hydrostatic pressure of said high pressure ambient fluid to thereby act against said pressure surface and force said annular member from said first position to said second position.

12. A valve as set forth in claim 1 further including a plurality of stop bolts attached to said housing and coacting with said annular member for defining said second position of said annular member.

13. A valve as set forth in claim 1 further including a stop ring attached to said housing and coacting with said annular member for defining said second position of said annular member.

14. A valve as set forth in claim 1 further including a stop cap attached to said housing and coacting with said annular member for defining said second position of said annular member.

15. A valve as set forth in claim 14 wherein said stop cap has an opening for enabling fluid flow through said stop cap.

* * * * *